US005968249A

United States Patent [19]

Liang

[11] Patent Number: 5,968,249

[45] Date of Patent: Oct. 19, 1999

[54] PROCESS FOR PREPARING SILICA PIGMENT

[76] Inventor: Ju Chen Liang, Fl. 1st, No. 35, Alley 20, Lane 284, Wu-Hsing St., Taipei, Taiwan, 106

[21] Appl. No.: 09/008,291

[22] Filed: Jan. 16, 1998

[51] Int. Cl.[6] .................... C04B 14/04; C01B 33/12

[52] U.S. Cl. .................... 106/482; 423/335; 423/339

[58] Field of Search .................... 106/482, 481; 423/335, 339

[56] References Cited

U.S. PATENT DOCUMENTS 3,202,525 8/1965 Burke et al. .

*Primary Examiner*—Michael Marcheschi

*Attorney, Agent, or Firm*—Bacon & Thomas, PLLC

[57] ABSTRACT

A process for preparation of silica pigment by mixing sea water and an aqueous solution of sodium silicate is disclosed, in which no acidulating agent is used and the amount of sea water is 50–500 times of the sodium silicate by weight.

6 Claims, No Drawings

PROCESS FOR PREPARING SILICA PIGMENT

FIELD OF THE INVENTION

The present invention is related to a process for preparing silica pigment, and in particular to a process for preparing silica pigment by mixing sea water and an aqueous solution of sodium silicate.

BACKGROUND OF THE INVENTION

The present invention is related to a process for preparing silica pigment, and in particular to a process for preparing silica pigment by mixing sea water and an aqueous solution of sodium silicate.

U.S. Pat. No. 3,202,525 discloses a process for forming silica pigment from an aqueous medium containing sodium silicate, in which sea water is added to the aqueous medium in the portion of from about one-half liter to about fifteen liters per mole of alkalinity, calculated as $Na_2O$, of the sodium silicate during the addition of an acidulating agent. According to the teaching of this prior art the acidulating agent is indispensable for forming the silica pigment as a precipitate. Moreover, the effect of the mixing ratio of sea water and sodium silicate on the yield of the silica pigment has not been discussed in U.S. Pat. No. 3,202,525, in Example II of which the mixing ratio of sea water and sodium silicate was about 26.4 by weight.

SUMMARY OF THE INVENTION

An object of the present invention is to provide a process for preparing silica pigment from sea water without using an acidulating agent.

Another object of the present invention is to provide a process for preparing silica pigment from sea water having a high yield.

In order to accomplish these objects, a process for preparing silica pigment according to the present invention comprises mixing sea water and an aqueous solution of sodium silicate, in which no acidulating agent is used and the amount of sea water is 50–600 times by weight of the sodium silicate contained in the aqueous solution.

DETAILED DESCRIPTION OF THE INVENTION

The present invention discloses a process of preparation of silica pigment comprises the following steps:

(a) mixing sea water with an aqueous solution of sodium silicate in a weight ratio of sea water to sodium silicate ranging from 50 to 600 so that a precipitate is formed, in which the aqueous solution of sodium silicate has a concentration of sodium silicate high than 10 wt %, preferably 20 wt %; and (b) removing the precipitate from the resulting mixture.

The process may further comprise a step: (c) drying the removed precipitate.

The process of the present invention may be conducted at room temperature and under atmospheric pressure.

The sodium silicate contained in the aqueous solution may be represented by a formula of $Na_2O(SiO_2)_x$, where x has a value between 1 and 4. The aqueous solution of sodium silicate used in the present invention is commercially available from the market as a trade name of water glass, which may be used directly or after dilution with water.

Preferably, the sea water and the aqueous solution of sodium silicate are mixed in a weight ratio of sea water to sodium silicate ranging from 80 to 400, more preferably from 100 to 200, and most preferably from 110 to 160.

Said precipitate may be removed from the mixture by any separation methods known in the art, for examples, filtration and centrifugation.

The removed precipitate may be dried by evaporating liquid therefrom without heating or by heating with a conventional oven, an infrared heater or sun irradiation.

Optionally, the process may further comprise a step of purifying which is carried out prior to the drying step, and/or following the drying step a step of grounding the dried precipitate. The precipitate may be purified by any methods known in the art, for example, washing the precipitate with water. The dried precipitate can be grounded to powder form in any grounding machine known in the art.

The mechanism of forming silica pigment by mixing sea water with the sodium silicate aqueous solution is not known; however, it can be seen from the following control examples that no silica pigment will be formed when a NaCl aqueous solution is mixed with the sodium silicate aqueous solution.

EXAMPLES 1–10

One part by weight of 56° Be" (49.3 wt % of sodium silicate) water glass was mixed, at room temperature, independently with 5, 10, 20, 30, 40, 50, 60, 80, 100, and 200 parts by weight of sea water in Examples 1, 2, 3, 4, 5, 6, 7, 8, 9 and 10, respectively. The mixtures were stirred for a period of 10–30 minutes and then allowed to stand for a period of time so that white precipitates were formed at the bottom of the mixtures. The precipitates were removed by filtration, and dried to obtain 0.03, 0.08, 0.18, 0.30, 0.38, 0.44, 0.48, 0.46, 0.45 and 0.41 parts by weight of dry silica pigment. Yield: 6.1 wt %, 16.0 wt %, 36.5 wt %, 60.9 wt %, 77.1 wt %, 89.2 wt %, 98.4 wt %, 95.7 wt %, 92.9 wt % and 82.8 wt % based on the sodium silicate.

Example 7 has the highest silica pigment yield of 98.4 wt %, in which the amount of sea water used is 60 times by weight of the water glass (about 120 times by weight of the sodium silicate). The silica pigment yield can be maintained at a value higher than 89 wt % (Examples 6–9) when the amount of sea water used is 50 to 100 times by weight of the water glass (about 100 to 200 times by weight of the sodium silicate).

Control Examples 1–5

One part by weight of 56° Be" (49.3 wt % of sodium silicate) water glass was mixed, at room temperature, independently with 60 parts by weight of 1 wt %, 2 wt %, 3 wt %, 4 wt % and 5 wt % aqueous NaCl solutions in Control Examples 1, 2, 3, 4 and 5, respectively. The mixtures were stirred for several hours and no precipitate was found in the mixtures.

What is claimed is:

1. A process for preparing a silica pigment comprising the following steps:

(a) mixing sea water with an aqueous solution of sodium silicate. in which no acidulating agent is used in a weight ratio of sea water to sodium silicate ranging from 50 to 600 so that a precipitate is formed, in which the aqueous solution of sodium silicate has a concentration of sodium silicate higher than 10 wt %; and (b) removing the precipitate from the resulting mixture.

2. The process according to claim 1 further comprising a step: (c) drying the removed precipitate.

3. The process according to claim 1, wherein the aqueous solution of sodium silicate has a concentration of sodium silicate higher than 20 wt %.

4. The process according to claim 1, wherein the sea water and the aqueous solution of sodium silicate are mixed in a weight ratio of sea water to sodium silicate ranging from 80 to 400.

5. The process according to claim 1, wherein the sea water and the aqueous solution of sodium silicate are mixed in a weight ratio of sea water to sodium silicate ranging from 100 to 200.

6. The process according to claim 1, wherein the sea water and the aqueous solution of sodium silicate are mixed in a weight ratio of sea water to sodium silicate ranging from 110 to 160.

* * * * *